United States Patent
Li et al.

(10) Patent No.: US 10,886,551 B2
(45) Date of Patent: Jan. 5, 2021

(54) METHOD FOR SYNCHRONOUSLY RECOVERING METAL AND ELEMENTAL SULFUR

(71) Applicant: Jiangnan University, Wuxi (CN)

(72) Inventors: Xiufen Li, Wuxi (CN); Xiguang Qi, Wuxi (CN); Xinhua Wang, Wuxi (CN); Yueping Ren, Wuxi (CN)

(73) Assignee: Jiangnan University, Wuxi (CN)

( * ) Notice: Subject to any disclaimer, the term of this patent is extended or adjusted under 35 U.S.C. 154(b) by 186 days.

(21) Appl. No.: 16/141,473

(22) Filed: Sep. 25, 2018

(65) Prior Publication Data

US 2019/0338426 A1    Nov. 7, 2019

(30) Foreign Application Priority Data

May 2, 2018   (CN) .......................... 2018 1 0408108

(51) Int. Cl.
| | |
|---|---|
| *H01M 8/16* | (2006.01) |
| *C25B 1/00* | (2006.01) |
| *C25B 5/00* | (2006.01) |
| *C25B 9/10* | (2006.01) |
| *H01M 8/22* | (2006.01) |

(52) U.S. Cl.
CPC ................ *H01M 8/16* (2013.01); *C25B 1/00* (2013.01); *C25B 5/00* (2013.01); *C25B 9/10* (2013.01); *H01M 8/22* (2013.01)

(58) Field of Classification Search
CPC ................................... H01M 8/16; C25B 1/00
See application file for complete search history.

(56) References Cited

U.S. PATENT DOCUMENTS

| | | | |
|---|---|---|---|
| 9,755,261 B2* | 9/2017 | Li | .............................. C22B 3/18 |
| 2015/0064501 A1* | 3/2015 | Ren | .................... H01M 8/04082 |
| | | | 429/2 |

FOREIGN PATENT DOCUMENTS

| | | | |
|---|---|---|---|
| CN | 103131856 A | * | 6/2013 |
| CN | 105621591 A | * | 6/2016 |
| CN | 108448144 A | * | 8/2018 |

\* cited by examiner

*Primary Examiner* — Nicholas A Smith
(74) *Attorney, Agent, or Firm* — IPro, PLLC; Na Xu

(57) ABSTRACT

The present disclosure discloses a method for synchronously recovering metal and elemental sulfur, particularly to a method for synchronously recovering metal and elemental sulfur in sulfide ore tailings, and belongs to the technical field of waste recycling. According to the present disclosure, metal and sulfur element are transferred from a solid phase to a liquid phase in the form of ions respectively by leaching the sulfide ore tailings in an anode chamber, then metal ions are recovered in the form of hydroxide precipitate in a first cathode chamber, and sulfate ions are recovered in the form of elemental sulfur precipitate in a second cathode chamber. The method of the present disclosure can synchronously realize the recovery of metal and elemental sulfur in sulfide ore tailings, such that a metal recovery rate is up to 89.4%, and an elemental sulfur recovery rate is up to 45.7%, meanwhile, a process flow is simple, operating cost is low, recovery rates of metal and sulfur element in tailings are high, corrosion of equipment is alleviated, and secondary pollution is avoid.

6 Claims, 1 Drawing Sheet

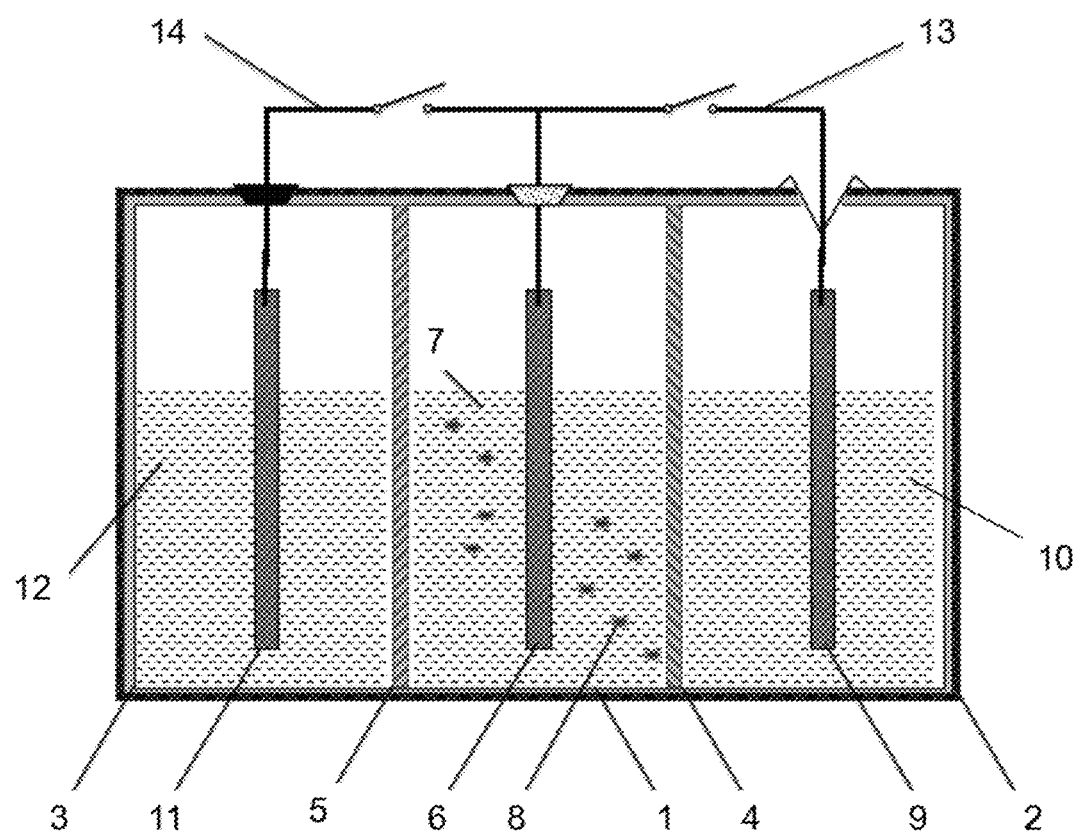

METHOD FOR SYNCHRONOUSLY RECOVERING METAL AND ELEMENTAL SULFUR

TECHNICAL FIELD

The present disclosure relates to a method for synchronously recovering metal and elemental sulfur, and more particularly relates to a method for synchronously recovering metal and elemental sulfur in sulfide ore tailings, and belongs to the technical field of waste recycling.

BACKGROUND

Mineral resources are an important part of human survival and social economic development. However, the development of mineral resources also causes many problems while bringing beneficial effects to social development. Mineral tailings generated due to low resource utilization during a mining process of mineral resources have increasingly serious damages to the environment, and therefore, how to efficiently treat the mine tailings is one of the environmental problems needing to be solved urgently.

The traditional mineral metallurgy processes are expensive to operate, consume a lot of energies, and are only suitable for development and utilization of high-grade ores, and therefore, traditional processes are obviously not suitable for low-grade ores, mine solid waste and tailings which are gradually increased at a present stage. For many years, researchers from various countries have been devoted to looking for efficient, economical and environmentally friendly low-grade lean ore or tailings treatment processes to replace traditional technologies, and hydrometallurgical technology has emerged.

Hydrometallurgy can be divided into microbial adsorption, microbial accumulation and microbial leaching according to different microbial effects. Among them, microbial leaching is widely used because it better satisfies the development requirements of metallurgical processes, and the treatment effect thereof is good. But problems of the technology still exist, including that the treatment cycle is long, leaching components inhibit the activity of mineral-bioleaching microorganisms, the leaching efficiency is low and the like.

A microbial fuel cell (MFC) belongs to one of microbial leaching technologies, which has the advantages of low cost, high metal recovery rate, high product purity, no secondary pollution, ability of recovering chemical energy in sewage or solid waste and converting it into electric energy, and the like, having become a research hotspot in the field of environmental biotechnology at present. The research on the MFC technology changes quickly, and its application field is rapidly expanding. The MFC has become one of pollution control and biomass energy conversion technologies with great potential application values.

There have been reports that double-chamber microbial fuel cell technologies are adopted for leaching metal from sulfide ore lean ore or tailings, of which leachate is for precipitating and recovering metals in another single-chamber microbial fuel cell. However, this mode still has the defects that, the metal ions need to be subjected to two steps of leaching and precipitation to be recovered, a process flow is complicated, recover metal and elemental sulfur cannot be recovered synchronously, and the like. However, the present disclosure attempts to utilize a one-step method to leach and precipitate metal and synchronously recovery elemental sulfur by a dual-chamber microbial fuel cell technology, providing a new way of thinking for tailings treatment.

SUMMARY

In view of the problems of the conventional microbial fuel cell technologies for recovering metal from sulfide ore lean ore or tailings, the present disclosure provides a method for synchronously recovering metal and elemental sulfur in sulfide ore tailings, which can synchronously complete the recovery of metal and elemental sulfur in iron sulfide ore tailings, such that a metal recovery rate is up to 89.4%, and an elemental sulfur recovery rate is up to 45.7%.

The technical solutions of the present disclosure are as follows:

The present disclosure provides a method for synchronously recovering metal and elemental sulfur in sulfide ore tailings, including the following steps: constructing a three-chamber microbial fuel cell including an anode chamber, a first cathode chamber and a second cathode chamber; inoculating a mixed bacterium solution in the anode chamber; placing a sulfide ore tailings solution into the anode chamber of the three-chamber microbial fuel cell; placing pH buffer solutions in the first cathode chamber and the second cathode chamber of the three-chamber microbial fuel cell; operating the three-chamber microbial fuel cell, oxidizing divalent sulfur in the sulfide ore tailings by an anode into sulfate ions to release electrons, meanwhile, dissolving and leaching metal ions, and transferring metal and sulfur elements in the sulfide ore tailings from a solid phase to a liquid phase in the forms of metal ions and sulfate ions, respectively; arranging a closed circuit between the anode and a first cathode, arranging an open circuit between the anode and a second cathode, and under action of an electric field, enabling the metal ions leached from the anode chamber to penetrate through a cation exchange membrane to reach the first cathode chamber, and combine with hydroxyl to be precipitated in a precipitate form, such that metal element in the tailings is recovered; arranging an open circuit between the anode and the first cathode, arranging a closed circuit between the anode and the second cathode, and under the action of an electric field, enabling sulfate ions leached from the anode chamber to penetrate through the anion exchange membrane to reach the second cathode chamber and be precipitated out in the form of elemental sulfur, such that the sulfur element in the tailings is recovered, the anode chamber of the three-chamber microbial fuel cell being located between the first cathode chamber and the second cathode chamber, the anode chamber and the first cathode chamber being separated by the cation exchange membrane, the anode chamber and the second cathode chamber being separated by the anion exchange membrane, and the anode being connected with the first cathode and the second cathode through titanium wires.

In one embodiment of the present disclosure, the mixed bacterium solution is a mixed bacterium solution including *Thiobacillus thiooxidans* and *Thiobacillus ferrooxidans*.

In an embodiment of the present disclosure, a general reaction formula of the microbial fuel cell can be: $FeS+O_2+H^++H_2O \rightarrow Fe(OH)_3\downarrow+S^0\downarrow$; a reaction formula of the anode chamber of the microbial fuel cell can be: $FeS+4H_2O \rightarrow Fe^{3+}+8H^++SO_4^{2-}+9e^-$; a reaction formula of the first cathode chamber of the microbial fuel cell can be: $Fe^{3+}+3H_2O \rightarrow Fe(OH)_3\downarrow+3H^+$ and $O_2+4H^++4e^- \rightarrow 2H_2O$; and a reaction formula of the second cathode chamber of the microbial fuel cell can be: $SO_4^{2-}+8H^++6e^- \rightarrow S^0\downarrow+4H_2O$, or, the general reaction formula of the microbial fuel cell may be: $2CuS+2H_2O+5O_2 \rightarrow 2Cu(OH)_2\downarrow+2SO_4^{2-}+6e^-$; an anode reaction formula of the microbial fuel cell is: $CuS+4H_2O \rightarrow Cu^{2+}+8H^++SO_4^{2-}+8e^-$; a reaction formula of the first cathode chamber of the microbial fuel cell is: $Cu^{2+}+2H_2O \rightarrow Cu(OH)_2\downarrow+4H^+$ and $O_2+4H^++4e^- \rightarrow 2H_2O$; and the reaction formula of the second cathode chamber of the microbial fuel cell can be: $SO_4^{2-}+8H^++6e^- \rightarrow S^0\downarrow+4H^2O$.

In one embodiment of the present disclosure, the effective volumes of the anode chamber and the cathode chamber are both 28 mL.

In one embodiment of the present disclosure, both the anode and the cathode are made of carbon felt.

In one embodiment of the present disclosure, the sulfide ore tailings include iron sulfide ore tailings, copper sulfide ore tailings, zinc sulfide ore tailings and silver sulfide ore tailings.

In one embodiment of the present disclosure, the sulfide ore tailings are iron sulfide ore tailings.

In one embodiment of the present disclosure, a concentration of the sulfide ore tailings solution placed into the anode chamber is 1 to 100 g/L.

In one embodiment of the present disclosure, the concentration of the sulfide ore tailings solution placed into the anode chamber is 20 to 50 g/L.

In an embodiment of the present disclosure, after the sulfide ore tailings solution is placed in the anode chamber, pH is adjusted to 2.5 with 5% dilute sulfuric acid and 5% sodium hydroxide, and the anode chamber is sealed after being filled with nitrogen for 10 minutes, such that the anode chamber is in an anaerobic state.

In one embodiment of the present disclosure, concentrations of the pH buffer solutions placed in the first cathode chamber and the second cathode chamber are 50 mmol/L.

In one embodiment of the present disclosure, the pH buffer solutions placed in the first cathode chamber and the second cathode chamber are citrate buffer solutions with the concentration of 50 mmol/L.

In one embodiment of the present disclosure, the pH value of the pH buffer solution in the first cathode chamber is 3.5 to 5.8.

In one embodiment of the present disclosure, the pH value of the pH buffer solution in the first cathode chamber is 4.0 to 5.5.

In one embodiment of the present disclosure, the pH value of the pH buffer solution in the second cathode chamber is 2.9 to 4.1.

In one embodiment of the present disclosure, the pH value of the pH buffer solution in the second cathode chamber is 3.3 to 3.8.

In one embodiment of the present disclosure, a metal element recovery process in the first cathode chamber and a sulfur element recovery process in the second cathode chamber are alternately operated.

The present disclosure provides a device for synchronously recovering metal and elemental sulfur in sulfide ore tailings, and the device is used for implementing the above method for synchronously recovering metal and elemental sulfur in sulfide ore tailings; the device includes an anode chamber 1, a first cathode chamber 2 and a second cathode chamber 3; the anode chamber 1 is separated from the first cathode chamber 2 through a cation exchange membrane 4; the anode chamber 1 is separated from the second cathode chamber 3 through an anion exchange membrane 5; the anode chamber 1 includes an anode 6, a first solution 7 and a mixed bacterium solution 8; the first cathode chamber 2 includes a first cathode 9 and a second solution 10; the second cathode chamber 3 includes a second cathode 11 and a third solution 12; the anode 6 is connected with the first cathode 9 and the second cathode 11 through a first titanium wire 13 and a second titanium wire 14 respectively.

In one embodiment of the present disclosure, the effective volumes of the anode chamber 1, the first cathode chamber 2, and the second cathode chamber 3 are all 28 mL.

In an embodiment of the present disclosure, the anode 6, the first cathode 9, and the second cathode 11 are made of carbon felt, carbon cloth, graphite, a carbon felt modified material, a carbon cloth modified material or a graphite modified material.

In one embodiment of the present disclosure, the anode 6, the first cathode 9, and the second cathode 11 are made of carbon felt.

In one embodiment of the present disclosure, the first solution 7 is an acid solution and/or an alkali solution.

In one embodiment of the present disclosure, the first solution 7 is dilute sulfuric acid and sodium hydroxide.

In one embodiment of the present disclosure, the first solution 7 is 5% dilute sulfuric acid and 5% sodium hydroxide.

In one embodiment of the present disclosure, the pH of the first solution 7 is 2.5.

In one embodiment of the present disclosure, the mixed bacterium solution 8 is a mixed bacterium solution including *Thiobacillus thiooxidans* and *Thiobacillus ferrooxidans*.

In one embodiment of the present disclosure, the second solution 10 and the third solution 12 are pH buffer solutions.

In one embodiment of the present disclosure, the second solution 10 and the third solution 12 are pH buffer solutions with the concentration of 50 mmol/L.

In one embodiment of the present disclosure, the second solution 10 and the third solution 12 are citrate buffer solutions with the concentration of 50 mmol/L.

In one embodiment of the present disclosure, a pH value of the second solution 10 is 3.5 to 5.8.

In one embodiment of the present disclosure, the pH value of the second solution 10 is 4.0 to 5.5.

In one embodiment of the present disclosure, a pH value of the third solution 12 is 2.9 to 4.1.

In one embodiment of the present disclosure, the pH value of the third solution 12 is 3.3 to 3.8.

The present disclosure provides application of the above-mentioned method for synchronously recovering metal and elemental sulfur in sulfide ore tailings or the above-mentioned device for synchronously recovering metal and elemental sulfur in sulfide ore tailings in recovering metal and treating environment.

Beneficial Effects:

(1) According to the method and the device of the present disclosure, the metal recovery rate is up to 89.4%, and the elemental sulfur recovery rate is up to 45.7%.

(2) In the method and the device of the present disclosure, electrons generated from the oxidation of divalent sulfur in the sulfide ore tailings are consumed in the first cathode chamber and the second cathode chamber, respectively, generating hydroxide precipitates and elemental sulfur precipitates, respectively at the same time, such that the leaching in tailings and the recovery of the metal and sulfur element in sulfide ores can be synchronously completed, a processing cycle is short, a process flow is simple, and operating cost is low.

(3) In the method and the device of the present disclosure, the anodic sulfide ore is oxidized and leached to continuously generate metal ions and sulfate ions, which respectively penetrate through the cation exchange membrane and the anion exchange membrane to reach the first cathode chamber and the second cathode chamber, and are continuously consumed, avoiding problems that the concentrations of metal ions and sulfate ions increase with the leaching time, and the feedback inhibits the leaching microbial activity of the anode to reduce an overall leaching rate, such that the anode leaching process can be implemented continuously, and the recovery rate of metal element in the tailings is significantly improved.

(4) In the method and the device of the present disclosure, the sulfate ions generated by the oxidized and leached anode sulfide ore continuously penetrate through the anion exchange membrane to reach the second cathode chamber, are reduced to elemental sulfur at the cathode, and are precipitated, such that elemental sulfur is recovered from the tailings while the metal element in tailings is recovered.

(5) In the method and the device of the present disclosure, protons generated by the anodic oxidation reaction pass through the cation exchange membrane to reach the first cathode chamber, and are combined with oxygen to generate water together with the protons formed by the hydroxide precipitation, such that acid corrosion of equipment is relieved, and secondary pollution is avoided.

BRIEF DESCRIPTION OF FIGURES

FIG. 1 is a schematic diagram of a device for synchronously recovering metal and elemental sulfur in sulfide ore tailings according to the present disclosure;

and in the diagram, anode chamber 1, first cathode chamber 2, second cathode chamber 3, cation exchange membrane 4, anion exchange membrane 5, anode 6, first solution 7, mixed bacterium solution 8, first cathode 9, second solution 10, second cathode 11, third solution 12, first titanium wire 13, and a second titanium wire 14.

DETAILED DESCRIPTION

The present disclosure will be further exemplified by taking pyrrhotine in iron sulfide ore and chalcopyrite in copper sulfide ore as examples. The following embodiments facilitate the better understanding of the present disclosure, but do not cover all experiments performed by the inventors, with the sole purpose of using those data to illustrate the intuitiveness and accuracy of a method defined in the present disclosure.

Detection methods involved in the following embodiments are as follows:

The detection method of iron ion concentration: adopt iron determination-flame atomic absorption spectrophotometry (GB11911-89), wherein a recovery rate of iron is $R_1$ (%):

$$R_1 = (m_{Fe}/m_{pv})*100\%$$

wherein mFe is the mass (mg) of iron element in the precipitate of the first cathode chamber, and mpv is the mass (mg) of the iron element in the original magnetic pyrite (FeS) tailings.

The detection method of copper ion concentration: adopt inductively coupled plasma mass spectrometry (HJ 700-2014), wherein a recovery rate of copper is $R_1$ (%):

$$R_1 = (m_{Cu}/m_{pv})*100\%$$

wherein mCu is the mass (mg) of the copper element in the precipitate of the first cathode chamber, and mpv is the mass (mg) of the cooper element in the original chalcopyrite (Cus) tailings.

The detection method of sulfate ion concentration: adopt determination-ion chromatography (HJ/T84-2001) of inorganic anions, wherein a recovery rate of elemental sulfur is $R_2$ (%):

$$R_2 = (m_S/m_{pv})*100\%$$

wherein mS is the mass (mg) of sulfur element in the precipitate of the second cathode chamber, and mpv is the mass (mg) of the sulfur element in the original magnetic pyrite (FeS) tailings.

As shown in FIG. 1, the device for synchronously recovering metal and elemental sulfur in sulfide ore tailings provided by the present disclosure includes an anode chamber 1, a first cathode chamber 2 and a second cathode chamber 3; the anode chamber 1 is separated from the first cathode chamber 2 through a cation exchange membrane 4; the anode chamber 1 is separated from the second cathode chamber 3 through an anion exchange membrane 5; the anode chamber 1 includes an anode 6, a first solution 7 and a mixed bacterium solution 8; the first cathode chamber 2 includes a first cathode 9 and a second solution 10; the second cathode chamber 3 includes a second cathode 11 and a third solution 12; the anode 6 is connected with the first cathode 9 and the second cathode 11 through a first titanium wire 13 and a second titanium wire 14 respectively.

Further preferably, the effective volumes of the anode chamber 1, the first cathode chamber 2, and the second cathode chamber 3 are all 28 mL.

Further preferably, the anode 6, the first cathode 9, and the second cathode 11 are made of carbon felt, carbon cloth, graphite, a carbon felt modified material, a carbon cloth modified material or a graphite modified material.

Further preferably, the anode 6, the first cathode 9, and the second cathode 11 are made of carbon felt.

Further preferably, the first solution 7 is an acid solution and/or an alkali solution.

Further preferably, the first solution 7 is dilute sulfuric acid and sodium hydroxide.

Further preferably, the first solution 7 is 5% dilute sulfuric acid and 5% sodium hydroxide.

Further preferably, the pH of the first solution 7 is 2.5.

Further preferably, the mixed bacterium solution 8 is a mixed bacterium solution including *Thiobacillus thiooxidans* and *Thiobacillus ferrooxidans*.

Further preferably, the second solution 10 and the third solution 12 are pH buffer solutions.

Further preferably, the second solution 10 and the third solution 12 are pH buffer solutions with the concentration of 50 mmol/L.

Further preferably, the second solution 10 and the third solution 12 are citrate buffer solutions with the concentration of 50 mmol/L.

Further preferably, the pH value of the second solution 10 is 3.5 to 5.8.

Further preferably, the pH value of the second solution 10 is 4.0 to 5.5.

Further preferably, the pH value of the third solution 12 is 2.9 to 4.1.

Further preferably, the pH value of the third solution 12 is 3.3 to 3.8.

One use method of the device for synchronously recovering the metal and elemental sulfur in sulfide ore tailings provided by the present disclosure is pouring sulfide ore tailings solution into the anode chamber 1.

Further preferably, the concentration of the sulfide ore tailings solution is 1 to 100 g/L.

Further preferably, the concentration of the sulfide ore tailings solution is 20 to 50 g/L.

Further preferably, the sulfide ore tailings include iron sulfide ore tailings, copper sulfide ore tailings, zinc sulfide ore tailings, silver sulfide ore tailings and aluminum sulfide ore tailings.

Further preferably, the sulfide ore tailings are iron sulfide ore tailings.

Further preferably, after the sulfide ore tailings solution is poured into the anode chamber 1, the anode chamber 1 is sealed after being filled with nitrogen for 10 minutes, such that the anode chamber 1 is placed in an anaerobic state.

Further preferably, during a process of operating the device for synchronously recovering metal and elemental sulfur in sulfide ore tailings, it is required that the first titanium wire 13 is closed and the second titanium wire 14 is disconnected, and then the first titanium wire 13 is disconnected and the second titanium wire 14 is closed. During the entire operation, the actions of disconnecting and closing need to be alternated.

Embodiment I

A three-chamber MFC as shown in FIG. 1 is constructed, such that an anode chamber of the three-chamber MFC is located between a first cathode chamber and a second cathode chamber, the anode chamber and the first cathode chamber are separated by a cation exchange membrane, the anode chamber and the second cathode chamber are separated by an anion exchange membrane, and the anode is connected with the first cathode and the second cathode through titanium wires. The effective volumes of the anode chamber, the first cathode chamber and the second cathode chamber are all 28 mL. The anode and the cathodes are all made of carbon felt. 28 mL of 1 g/L pyrrhotite tailings solution is added in the anode chamber, pH is adjusted to 2.5 with 5% dilute sulfuric acid and 5% sodium hydroxide, mixed liquid containing *Thiobacillus thiooxidans* and *Thiobacillus ferrooxidans* is inoculated, and sealing is performed after nitrogen filling for 10 minutes, such that the anode chamber is placed in an anaerobic state. 28 mL of 50 mmol/L citrate buffer solutions are added in the first cathode chamber and the second cathode chamber, respectively, and pH values are 3.5 and 2.9, respectively, with a constant temperature at 30° C. After the operation of the three-chamber MFC device, a pyrrhotite leaching rate is 68.5%, iron and sulfur recovery rates are 75.3% and 26.4%, respectively, and the metal precipitation recovery process does not require additional power consumption.

Embodiment II

The differences from Embodiment 1 are that the pyrrhotite concentration of the anode chamber is 50 g/L, and the pH values of the first cathode chamber and the second cathode chamber are 4.5 and 3.5, respectively. After the operation of the three-chamber MFC device, the pyrrhotite leaching rate is 60.2%, the iron and sulfur recovery rates are 69.3% and 22.9%, respectively, and the metal precipitation recovery process does not require additional power consumption.

Embodiment III

The differences from Embodiment I are that the pyrrhotite concentration of the anode chamber is 100 g/L, and the pH values of the first cathode chamber and the second cathode chamber are 5.8 and 4.1, respectively. After the operation of the three-chamber MFC device, the pyrrhotite leaching rate is 59.0%, the iron and sulfur recovery rates are 65.8% and 20.7%, respectively, and the metal precipitation recovery process does not require additional power consumption.

Embodiment IV

The differences from Embodiment I are that the pyrrhotite concentration of the anode chamber is 25 g/L, and the pH values of the first cathode chamber and the second cathode chamber are 4.5 and 3.5, respectively. After the operation of the three-chamber MFC device, the pyrrhotite leaching rate is 73.6%, the iron and sulfur recovery rates are 89.4% and 45.7%, respectively, and the metal precipitation recovery process does not require additional power consumption.

Embodiment V

The differences from Embodiment I are that the pyrrhotite concentration of the anode chamber is 25 g/L, and the pH values of the first cathode chamber and the second cathode chamber are both 3.5. After the operation of the three-chamber MFC device, the pyrrhotite leaching rate is 70.9%, the iron and sulfur recovery rates are 85.5% and 44.0%, respectively, and the metal precipitation recovery process does not require additional power consumption.

Embodiment VI

The differences from Embodiment I are that a chalcopyrite concentration of the anode chamber is 25 g/L, and the pH values of the first cathode chamber and the second cathode chamber are both 3.5. After the operation of the three-chamber MFC device, a chalcopyrite leaching rate is 80.9%, the copper and sulfur recovery rates are 86.6% and 49.0%, respectively, and the metal precipitation recovery process did not require additional power consumption.

Comparative Embodiment I

The differences from Embodiment I are that the pyrrhotite concentration of the anode chamber is 25 g/L, and the pH values of the first cathode chamber and the second cathode chamber are 2.5 and 5.0, respectively. After the operation of the three-chamber MFC device, the pyrrhotite leaching rate is 36.4%, the iron and sulfur recovery rates are 28.9% and 9.2%, respectively, and the metal precipitation recovery process does not require additional power consumption.

Comparative Embodiment II

The differences from Embodiment I are that the pyrrhotite concentration of the anode chamber is 25 g/L, and the pH values of the first cathode chamber and the second cathode chamber are 6.0 and 2.2, respectively. After the operation of the three-chamber MFC device, the pyrrhotite leaching rate is 41.4%, the iron and sulfur recovery rates are 12.6% and 5.2%, respectively, and the metal precipitation recovery process does not require additional power consumption.

Comparative Embodiment III

The difference from Embodiment I is that the anode chamber and the first cathode chamber are separated by a proton exchange membrane, the anode chamber and the second cathode chamber are also separated by a proton exchange membrane, the pyrrhotite concentration of the anode chamber is 25 g/L, and the pH values of the first cathode chamber and the second cathode chamber are both 3.5. After the operation of the three-chamber MFC device, the pyrrhotite leaching rate is 38.4%, and the iron and sulfur recovery rates are 38.6% and 1.6%, respectively. The precipitation recovery process does not require additional power consumption.

What is claimed is:

1. A method for synchronously recovering metal and elemental sulfur in sulfide ore tailings, characterized by:
   constructing a three-chamber microbial fuel cell comprising an anode chamber, a first cathode chamber and a second cathode chamber; inoculating a mixed bacterium solution in the anode chamber; placing a sulfide ore tailings solution into the anode chamber of the three-chamber microbial fuel cell;
   placing pH buffer solutions in the first cathode chamber and the second cathode chamber of the three-chamber microbial fuel cell; operating the three-chamber microbial fuel cell, and oxidizing, by an anode, divalent sulfur in the sulfide ore tailings into sulfate ions to release electrons, and meanwhile, dissolving and leaching metal ions, and transferring metal and sulfur element in the sulfide ore tailings from a solid phase to a liquid phase in the forms of metal ions and sulfate ions, respectively;
   arranging a closed circuit between the anode and a first cathode, arranging an open circuit between the anode and a second cathode, and under action of an electric field, enabling the metal ions leached from the anode chamber to penetrate through a cation exchange membrane to reach the first cathode chamber, and combining with hydroxyl to be precipitated in a precipitate form, such that the metal element in the tailings is recovered;
   arranging an open circuit between the anode and the first cathode, arranging a closed circuit between the anode and the second cathode, and under the action of an electric field, enabling sulfate ions leached from the anode chamber to penetrate through an anion exchange membrane to reach the second cathode chamber, and be precipitated out in the form of elemental sulfur, such that the sulfur element in the tailings is recovered; and
   wherein the anode chamber of the three-chamber microbial fuel cell being located between the first cathode chamber and the second cathode chamber, the anode chamber and the first cathode chamber being separated by the cation exchange membrane, the anode chamber and the second cathode chamber being separated by the anion exchange membrane, and the anode being connected with the first cathode and the second cathode through titanium wires.

2. The method for synchronously recovering metal and elemental sulfur in sulfide ore tailings according to claim 1, wherein the mixed bacterium solution is a mixed bacterium solution comprising *Thiobacillus thiooxidans* and *Thiobacillus ferrooxidans*.

3. The method for synchronously recovering metal and elemental sulfur in sulfide ore tailings according to claim 1, wherein a concentration of the sulfide ore tailings solution placed into the anode chamber is 1 to 100 g/L.

4. The method for synchronously recovering metal and elemental sulfur in sulfide ore tailings according to claim 1, wherein a pH value of the pH buffer solution in the first cathode chamber is 4.0 to 5.5.

5. The method for synchronously recovering metal and elemental sulfur in sulfide ore tailings according to claim 1, wherein a pH value of the pH buffer solution in the second cathode chamber is 2.9 to 4.1.

6. The method for synchronously recovering metal and elemental sulfur in sulfide ore tailings according to claim 1, wherein a metal element recovery process in the first cathode chamber and a sulfur element recovery process in the second cathode chamber are alternately operated.

* * * * *